July 17, 1956 H. W. YOUNG ET AL 2,755,120
LATCH CONSTRUCTION
Filed Feb. 24, 1953

INVENTORS:
HERBERT W. YOUNG
KENNETH G. KIMBLE
By: GLENN B. MORSE
ATTORNEY 2,755,120

LATCH CONSTRUCTION

Herbert W. Young and Kenneth G. Kimble, Grand Rapids, Mich., assignors to National Brass Company, a corporation of Michigan Application February 24, 1953, Serial No. 338,378

4 Claims. (Cl. 292—74)

The present invention relates to the construction of a latch of the type not provided with a roll-back mechanism. Having no means for manually retracting the bolt, a bolt for this type of latch must be capable of moving inwardly in response to pressure on the door in either opening or closing directions. It is conventional to provide opposite bevelled surfaces on the bolt for this purpose, and a true locking action in the sense of preventing opening of the door is not involved. Due to this characteristic, it is common to refer to this type of mechanism as a "friction latch," even though its holding power is not primarily determined by the mere creation of friction between the door and the jamb. The amount of force necessary to open the door against the action of the latch will be determined entirely by the relationship between the slope of the bevelled surfaces on the bolt and the strength of the biasing force applied to the bolt opposing the inward movement caused by the pressure against these surfaces.

The principal characteristic of the present invention relates to the manner of suspension of the bolt in the latch mechanism. Preferably, a conventional front plate is utilized having an aperture closely conforming to the cross section of the bolt, with sufficient extra clearance between bolt and aperture to permit a considerable amount of deviation of the bolt from its primary axis of retraction. The rearward portion of the bolt is mounted on a spring, the spring being seated on structure fixed with respect to the housing and the front plate. The dimensions of the spring are preferably such that a considerable amount of lateral articulation is possible within the confines of the case, and the deviation of the bolt from the axis of retraction is therefore accompanied by the resilient movement of the spring. With this arrangement, opening force applied to the door results not only in generating an inward component of force moving the bolt toward release position, but also applies a considerable torque to the bolt (the front plate acting as a fulcrum) and rotating it in a horizontal plane away from the position occupied prior to the application of such force. Such angular displacement of the bolt in a horizontal plane from its "rest" position serves to increase the slope of the bevelled surface of the bolt with respect to the keeper so that the keeper will have a greater mechanical advantage in inducing the retracting movement. This change in the attitude of the bolt with respect to the keeper has a tendency to reduce the effect of friction which might otherwise induce a jamming action rendering it difficult or impossible for opening force applied to the door to induce retracting movement. Wear on the surface of the bolt is capable of locally distorting the angle of bevel to such an extent that the angle of resultant forces caused by coefficient of friction would cause a very critical problem were it not for the ability of the bolt to move in a horizontal plane.

It is preferable that the amount of outward projection of the bolt be determined entirely by the equilibrium condition of the spring in the housing, this condition being defined as that in which no force is applied to the bolt in the direction of retraction or projection. In the preferred form, a double spring system is involved with one portion biasing the bolt in an outward direction, this force being balanced by a second portion normally biasing the bolt inwardly. The rest position of the bolt is determined by the balancing of these two spring actions, and the position of the bolt must be adjustable with respect to the spring in order to properly position the bevelled surfaces of the bolt so that no surface perpendicular to the door is presented to the keeper. In order to provide this adjustment, the preferred form of this invention has a bolt provided with a threaded rearward portion which cooperates with a series of coils of the spring in threaded engagement. These coils are preferably approximately in the center of the spring, on the opposite sides of which are the two spring portions referred to above. Adjustment of the relative position of bolt and spring in an inward-outward direction is accomplished by pulling the bolt outwardly a sufficient amount to disengage from the front plate aperture the portion of the bolt which has the non-circular cross section normally moving within the aperture. After this portion of the bolt has been disengaged in this fashion, rotation may be imparted to the bolt which will change the axial position of the threaded tail portion of the bolt with the cooperating section of the spring. At least one end of the spring should be securely held by structure fixed with respect to the case in order to make the relative rotation between bolt and spring possible. The withdrawal in an outward direction of the bolt for purposes of adjustment as outlined above is preferably facilitated by providing recesses in the upper and lower faces of the bolt which are available when the bolt is in the normal projected position.

In a modified form of construction of the present invention, the coils of the spring which engage the inner portion of the bolt form one extremity of a conventional conical spring. With this system, the bolt may be considered as balanced between the compression and tension actions of the spring rather than between opposite sections of spring which might conceivably be acting solely (alternatively) in compression. With the arrangement involving opposite sections of spring, it is possible for the spring to actually float with some degree of freedom within the case, although this is not desirable. Such a result might conceivably occur due to manufacturing tolerances, but it must be borne in mind that in any case there must be a restraint applied on the spring against rotation.

A further modification of the present invention involves a generally cylindrical spring rather than the conical sections referred to above. The purpose of this latter modification is to cause the spring to assist the deviation of the bolt from its rest position by angular movement in a horizontal plane. Inward force applied against the end of a compression spring of this description will tend to cause a buckling action similar to the failure of a slender column. Such action of course tends to facilitate the angular adjustment of the bolt in response to the forces applied to the bevelled surfaces.

The several features of the present invention will be discussed in detail through an analysis of the particular embodiments illustrated in the accompanying drawing. In the drawing, Figure 1 presents a front view of an assembled latch mechanism embodying the present invention.

Figure 1:
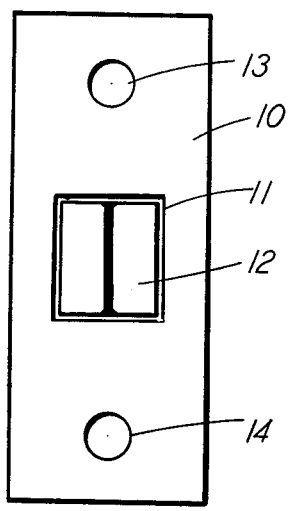

Referring to Figure 1, a front plate 10 of conventional design is provided with a substantially rectangular aperture 11 in which the bolt 12 reciprocates in moving from the projected to the retracted positions. The holes 13 and 14 in the front plate are provided according to conventional practice for securing the assembled mechanism in position in the door.

Figure 2:
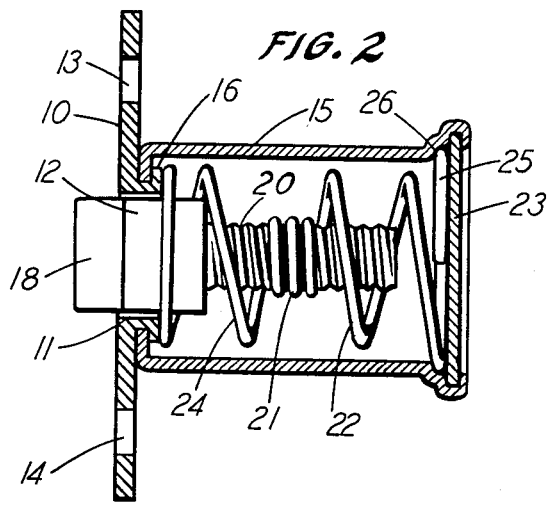
Figure 2 is a section on a vertical plane taken substantially through the axis of the present mechanism.
Figure 3:
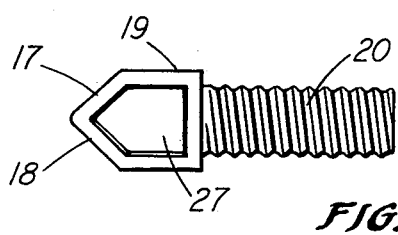
Figure 3 is a top view of the bolt utilized in the mechanism illustrated in Figure 2.

Referring to Figure 2, the housing 15 is secured to the front plate 10 in a conventional manner by the interengagement of formed flanges on these members as generally indicated at 16. Reference to Figures 2 and 3 will indicate that the bolt 12 is provided with the opposite bevelled surfaces 17 and 18, and also with the rectangular portion 19 which occupies the aperture 11 with the bolt in "rest" position. An inner projection 20 on the bolt has a threaded periphery which engages the central coils 21 of a spring. This spring has an inner section 22 having a base seated against the closure plate 23, and a forward portion 24 seated against the forward structure at the juncture of the housing 15 and the front plate 10. The action of the closure plate 23 serves to bind the inner coil 25 of the spring between the plate and the shoulder 26 of the housing 15. In this fashion, the spring is prevented from rotation about its axis.

The adjustment of the bolt in an inward-outward direction is accomplished first through pulling the bolt outwardly by grasping the projected portion, the outward movement being sufficient to disengage the rectangular portion 19 from the confines of the aperture 11. Such withdrawal of the bolt is facilitated by the presence of the recess 27, which normally appears on the outside of the front plate with the bolt in rest position. On withdrawal of the bolt as outlined above, it may then be rotated so as to induce relative rotation between the coils 21 and the threaded inward projection of the bolt 20. Since the inward-outward position of the bolt is determined by the balance of forces contributed by the inner section 22 and the outer section 24, the movement of the central coils 21 along the inner projection of the bolt will tend to move the bolt to the desired position, which should be such that no portion of the rectangular portion 19 projects beyond a forward surface of the front plate 10.

Figure 4:
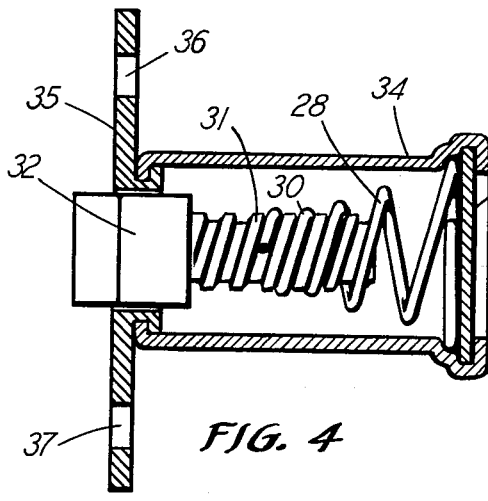
Figure 4 illustrates a modified form of the present invention.

It will be noted that clearance exists between the portions 22 and 24 of the spring and the inner diameter of the housing 15. Such clearance provides for the angular displacement of the bolt from its normal rest position on application of forces to the bevelled surfaces 17 and 18. The arrangement shown in Figure 4 presents a modified form providing this same type of action. In this modification, the spring 28 is substantially conical in form, its base being secured in position by the closure plate 29 in a similar fashion to that illustrated in Figure 2. The apex of the conical spring is formed by the coils 30 which engage the inner projection 31 of the bolt 32, this bolt being similar in form to that illustrated in Figure 3. As in the mechanism shown in Figure 2, the housing 34 is secured to a conventional front plate 35 having mounting holes 36 and 37. With the arrangement shown in the Figure 4 modification, the spring 28 operates from rest position to one of compression during the normal movement of the bolt. Outward movement of the bolt to provide for the adjustment referred to above will result in placing the spring 28 in tension. The Figure 4 spring is at all times firmly secured in position, while it is possible for the Figure 2 arrangement to involve a somewhat indeterminate axial position in the housing as long as rotation is inhibited by suitable means. The Figure 2 arrangement has a tendency to center the central coils 21 where they engage the bolt within the housing with less regard for the accumulation of spring tolerances.

Figure 5:
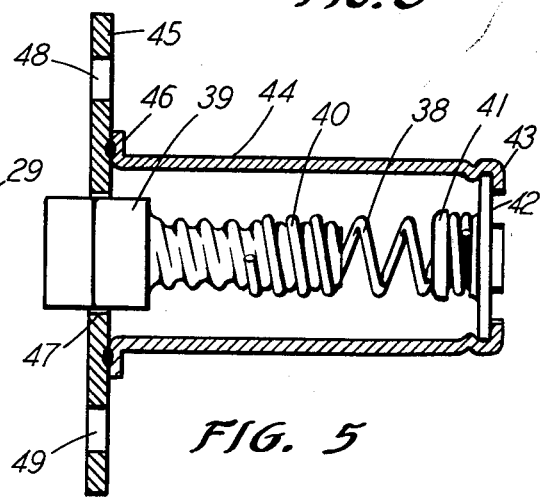
Figure 5 illustrates a further modification of the present invention.

Referring to Figure 5, a further modification of the present invention is shown in which the generally cylindrical compression spring 38 is used. A bolt 39 similar in form to that shown in Figure 3 is also used in conjunction with this modification, with the forward portion of the spring 38 terminating in the coils 40 adapted to engage the threaded projection of the bolt. The inner extremity of the spring 38 is adapted to engage the stud 41 which may be formed as a part of the closure plate 42 or be attached as a separate member. As in the case with the closure plates 23 and 29, the closure plate 42 is securely fastened in position through crimping a portion of the case as indicated at 43. It is important to note that the mounting of the inner end of the spring 38 must be of sufficient firmness to permit the spring to act in tension during the withdrawal of the bolt for adjustment of position. Freedom of the inner end of the spring to pivot slightly, however, increases the "buckling" action on retraction. In the arrangement shown in Figure 5, the housing 44 is spot-welded to the front plate 45 at the annular flange 46. The aperture 47 in the front plate 45 performs the same function as that of the previous modifications, and the mounting holes 48 and 49 are similarly provided according to conventional practice.

The particular embodiments of the present invention which have been illustrated and discussed herein are for illustrative purposes only, and are not to be considered as a limitation upon the scope of the appended claims. In these claims, it is our intent to claim the entire invention disclosed herein, except as we are limited by the prior art.

We claim:

1. A latch, comprising: housing means including a front plate having a bolt-receiving aperture; bolt means slideably mounted for movement in said aperture to and from retracted position; and coil spring means having a central portion in threaded engagement with the inner end of said bolt, an inner conical portion bearing against said housing means, and an outer conical portion surrounding said bolt and bearing against the outer portion of said housing means, said conical portions having their apex ends at said central portion, said spring means biasing said bolt toward a projected position determined by the equilibrium condition of said spring means in said housing means, said bolt being supported adjacent the inner end thereof exclusively by said spring means.

2. A latch, comprising: housing means including a front plate having a bolt-receiving aperture; bolt means slideably mounted for movement in said aperture to and from retracted position; and coil spring means substantially fixed rotatively with respect to said housing and having a central portion in threaded engagement with the inner end of said bolt, an inner portion bearing against said housing means, and an outer portion surrounding said bolt and bearing against the outer portion of said housing means, said spring means biasing said bolt toward a projected position determined by the equilibrium condition of said spring means in said housing means.

3. A latch, comprising: housing means including a front plate having a non-circular bolt-receiving aperture; bolt means having a gripping recess in the normally projected end thereof and slideably mounted for movement in said aperture to and from retracted position, said bolt means having an outer portion normally in non-rotative engagement with said aperture, and having an inner portion rotatable in said aperture; and coil spring means having threaded engagement with the inner end of said bolt and mounted in said housing means biasing said bolt toward a projected position determined by the equilibrium condition of said spring means in said housing means said spring means being substantially fixed rotatively with respect to said housing, and having at least one portion fixed with respect to said housing against inward axial movement and at least one portion fixed with respect to said housing against outward axial movement.

4. A latch, comprising: housing means including a front plate having a non-circular bolt-receiving aperture; bolt means slideably mounted for movement in said aperture to and from retracted position, said bolt means having an outer portion normally in non-rotative engagement with said aperture, and having an inner portion rotatable in said aperture; and coil spring means having threaded engagement with the inner end of said bolt and mounted in said housing means biasing said bolt toward a projected position determined by the equilibrium condition of said spring means in said housing means said spring means being substantially fixed rotatively with respect to said housing, and having at least one portion fixed with respect to said housing against inward axial movement and at least one portion fixed with respect to said housing against outward axial movement.

References Cited in the file of this patent

UNITED STATES PATENTS

| | | |
|---|---|---|
| 230,113 | Curran | July 20, 1880 |
| 486,476 | Kelsey | Nov. 22, 1892 |
| 1,398,573 | Reinl | Nov. 29, 1921 |
| 1,439,418 | Hubbard | Dec. 19, 1922 |
| 1,456,466 | Sauerbrei | May 22, 1923 |

FOREIGN PATENTS

| | | |
|---|---|---|
| 301 | Great Britain | 1901 |
| 511,685 | Belgium | June 14, 1952 |